United States Patent
Yang et al.

(10) Patent No.: US 11,893,988 B2
(45) Date of Patent: Feb. 6, 2024

(54) SPEECH CONTROL METHOD, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Song Yang, Beijing (CN); Saisai Zou, Beijing (CN); Jieyi Cao, Beijing (CN); Junyao Shao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 17/357,598

(22) Filed: Jun. 24, 2021

(65) Prior Publication Data

US 2021/0319795 A1  Oct. 14, 2021

(30) Foreign Application Priority Data

Nov. 3, 2020 (CN) .......................... 202011211760.9

(51) Int. Cl.
*G10L 15/22* (2006.01)
*G06F 16/635* (2019.01)
*G10L 15/05* (2013.01)

(52) U.S. Cl.
CPC ............ *G10L 15/22* (2013.01); *G06F 16/635* (2019.01); *G10L 15/05* (2013.01); *G10L 2015/223* (2013.01)

(58) Field of Classification Search
CPC . G10L 15/22; G10L 2015/223; G10L 15/005; G10L 17/18; G10L 17/22; G10L 15/04; G10L 15/00
See application file for complete search history.

(56) References Cited

U.S. PATENT DOCUMENTS 8,635,243 B2 *  1/2014  Phillips ................... G10L 15/30
                                                              704/235
8,886,545 B2 * 11/2014  Meisel .................... G10L 17/22
                                                              704/275

(Continued)

FOREIGN PATENT DOCUMENTS

CN       106782554 A     5/2017
CN       108962240 A    12/2018

(Continued)

OTHER PUBLICATIONS

Office Action for Japanese Application No. 2021-166825, dated Nov. 8, 2022, 3 pages.

(Continued)

*Primary Examiner* — Vijay B Chawan
(74) *Attorney, Agent, or Firm* — Lippes Mathias LLP

(57) ABSTRACT

The disclosure provides a speech control method, a speech control apparatus, an electronic device, and a storage medium. The method includes: acquiring target audio data sent by a client, the target audio data including audio data collected by the client within a target duration before wake-up and audio data collected by the client after wake-up; performing speech recognition on the target audio data; and controlling the client based on an instruction recognized from a second audio segment of the target audio data in response to recognizing a wake-up word from a first audio segment at beginning of the target audio data; in which, the second audio segment is later than the first audio segment or has an overlapping portion with the first audio segment.

12 Claims, 4 Drawing Sheets

(56) References Cited

U.S. PATENT DOCUMENTS

| | | | |
|---|---|---|---|
| 8,949,266 B2* | 2/2015 | Phillips | G10L 15/30 |
| | | | 704/7 |
| 11,145,314 B2* | 10/2021 | Peng | G10L 17/18 |
| 11,355,113 B2* | 6/2022 | Shao | G10L 15/32 |
| 11,393,458 B2* | 7/2022 | Shao | G10L 15/063 |
| 2011/0246621 A1* | 10/2011 | May, Jr. | H04L 65/612 |
| | | | 709/219 |
| 2016/0351196 A1* | 12/2016 | Fanty | G10L 15/183 |
| 2017/0162196 A1* | 6/2017 | Wang | G10L 15/22 |
| 2017/0213569 A1* | 7/2017 | Jang | G10L 25/87 |
| 2018/0174582 A1* | 6/2018 | Fanty | G10L 15/04 |
| 2018/0182398 A1* | 6/2018 | Halstvedt | G06F 16/3329 |
| 2019/0273963 A1* | 9/2019 | Jobanputra | G06F 3/165 |
| 2019/0318759 A1* | 10/2019 | Doshi | G10L 15/04 |
| 2020/0279561 A1* | 9/2020 | Sheeder | G06F 3/0346 |
| 2020/0374269 A1* | 11/2020 | Lidman | H04L 63/10 |
| 2021/0035572 A1* | 2/2021 | D'Amato | G06F 3/167 |
| 2021/0074138 A1* | 3/2021 | Micko | G08B 21/0492 |
| 2022/0103883 A1* | 3/2022 | Cunningham | H04N 21/8456 |

FOREIGN PATENT DOCUMENTS

| | | |
|---|---|---|
| CN | 109378000 A | 2/2019 |
| JP | H10254475 A | 9/1998 |
| JP | 2010055044 A | 3/2010 |
| JP | 2015011170 A | 1/2015 |
| JP | 2019185011 A | 10/2019 |

OTHER PUBLICATIONS

Office Action for Chinese Application No. 202011211760.9, dated May 19, 2023, 29 pages.

* cited by examiner

SPEECH CONTROL METHOD, ELECTRONIC DEVICE, AND STORAGE MEDIUM

CROSS-REFERENCE TO RELATED APPLICATION

This application is based on and claims priority to Chinese Patent Application No. 202011211760.9 filed on Nov. 3, 2020, the content of which is hereby incorporated by reference in its entirety into this disclosure.

TECHNICAL FIELD

The disclosure relates to the field of computer and deep learning (DL) technologies, particularly to speech technologies, cloud computing technologies, and natural language processing (NLP) technologies. The disclosure further relates to a speech control method, an electronic device, and a storage medium.

BACKGROUND

Applications and products of intelligent speech interaction are constantly increasing with the popularity of intelligent speech interaction, and requirements for improving a speech recognition rate are also gradually increasing.

SUMMARY

According to one aspect of the disclosure, a speech control method is provided. The method includes: acquiring target audio data sent by a client, the target audio data including audio data collected by the client within a target duration before wake-up and audio data collected by the client after wake-up; performing speech recognition on the target audio data; and controlling the client based on an instruction recognized from a second audio segment of the target audio data in response to recognizing a wake-up word from a first audio segment at beginning of the target audio data; in which, the second audio segment is later than the first audio segment or has an overlapping portion with the first audio segment.

According to another aspect of the disclosure, another speech control method is provided. The method includes: collecting audio data and recognizing a wake-up word from the collected audio data in a standby state; waking up in response to recognizing the wake-up word; taking audio data collected within a target duration before wake-up and audio data collected after wake-up as target audio data and sending the target audio data to a server; in which, the target audio data is configured for speech recognition, and to control based on an instruction recognized from a second audio segment of the target audio data in response to recognizing a wake-up word from a first audio segment at beginning of the target audio data; in which, the second audio segment is later than the first audio segment or has an overlapping portion with the first audio segment.

According to another aspect of the disclosure, an electronic device is provided. The electronic device includes: at least one processor; and a memory communicatively coupled to the at least one processor; in which, the memory is configured to store instructions executable by the at least one processor, and when the instructions are executed by the at least one processor, the at least one processor is caused to perform the method as described above.

According to another aspect of the disclosure, a non-transitory computer-readable storage medium storing computer instructions is provided, in which the computer instructions are configured to enable a computer to perform the method as described above.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The accompanying drawings are used to understand the solution better, and do not constitute a limitation on the disclosure, in which.

DETAILED DESCRIPTION

Figure 1:
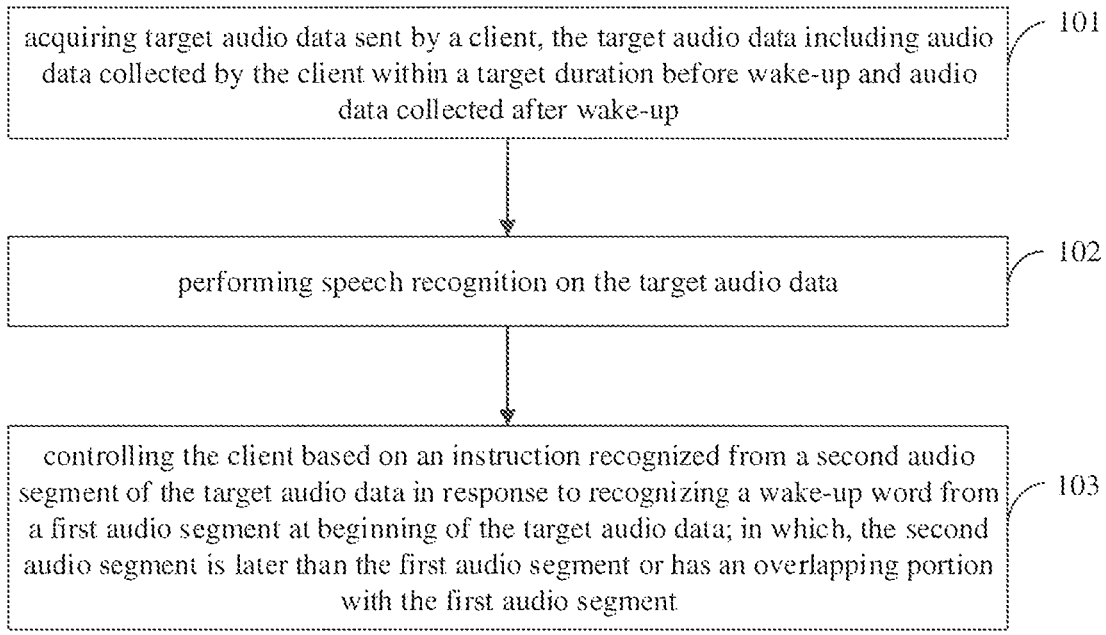
FIG. 1 is a flowchart illustrating a speech control method according to some embodiments of the disclosure.

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Applications and products of intelligent speech interaction are constantly increasing with the popularity of intelligent speech interaction, and requirements for improving a speech recognition rate are also gradually increasing. An intelligent device may detect a wake-up word based on an acquired speech, and update the acquired speech containing the wake-up word when the wake-up word is detected to a speech server for recognition to acquire a speech recognition result, and control a device based on the speech recognition result. Thus, it is vital to improve the speech control accuracy on the device that the speech recognition result is accurately acquired. Therefore, it is an urgent problem to be solved how to accurately recognize an instruction in a speech.

An intelligent device may detect a wake-up word based on an acquired speech, and launch a detection of a beginning point and an ending point of the speech when the wake-up word is detected, and update a speech between the beginning point and the ending point to a speech server for recognition to acquire a speech recognition result. However, the speech recognition is performed on the speech acquired based on the detection algorithm of the beginning point and the ending point, which has the following problems.

(1) Wake-up false alarm: since the wake-up detection algorithm itself is not strictly accurate, and the speech which is not the wake-up word may be detected as the wake-up word, the behavior itself of launching the detection of the beginning point and the ending point of the speech at this time is not correct. Therefore, the speech which is not the real intention of a user is sent for recognition.

(2) Poor reliability: since the wake-up time detected by the wake-up algorithm is not necessarily accurate, the speech beginning point acquired by launching the detection of the speech beginning point based on the wake-up time is not necessarily accurate. Thus, the data recognized by the cloud based on the acquired speech data is not accurate, and when the recognition engine recognizes the received data, it may not acquire a completely consistent recognition result, thereby affecting the recognition performance.

Therefore, embodiments of the disclosure provide a speech control method, to improve the speech control accuracy and the efficiency and reliability of instruction recognition.

A speech control method, a speech control apparatus, an electronic device, and a storage medium in the embodiments of the disclosure may be described referring to the accompanying drawings in embodiments of the disclosure.

FIG. 1 is a flowchart illustrating a speech control method according to some embodiments of the disclosure.

As illustrated in FIG. 1, the method includes the following.

At block 101, target audio data sent by a client is acquired, in which, the target audio data includes audio data collected by the client within a target duration before wake-up and audio data collected by the client after wake-up.

The executive body of some embodiments is a server, which may be a local server or may be a cloud server. The server may be a single server or may be a server cluster.

The client may refer to an application, a webpage, or a terminal device for which the server provides services, for example, a robot. For example, when the server of the disclosure is a server of speech-controlled applications, the client is all speech-controlled applications installed in the terminal devices of the users, which is not limited herein.

The target audio data is in an audio stream format, and speech consecutive collection is achieved through the audio stream format.

In some embodiments of the disclosure, the target audio data acquired by the server from the client includes the audio data collected by the client within the target duration before wake-up and the audio data collected by the client after wake-up. That is, the client performs speech detection before the server acquires the target audio data from the client and acquires the audio data of the target duration forward based on the detection time of the wake-up word after the wake-up word is detected and collects the audio data of a preset duration after wake-up. The target audio data in some embodiments traces the time point of detecting the wake-up word back to the target duration, for example, the time point of detecting the wake-up word is t, the time point of t-5 is taken as the beginning point of the speech, so as to acquire the target audio data of the duration T. The target audio data in the disclosure includes the audio data within the target duration before wake-up and the audio data collected after wake-up, so that the target audio data acquired may cover a speech portion of the wake-up word, to enhance the reliability of recognizing and acquiring the wake-up word from the target audio data.

At block 102, speech recognition is performed on the target audio data.

In detail, the server recognizes and filters the wake-up word based on the acquired target audio data, and recognizes a speech instruction, and controls the client based on the recognized speech instruction.

At block 103, the client is controlled based on an instruction recognized from a second audio segment of the target audio data in response to recognizing a wake-up word from a first audio segment at beginning of the target audio data; in which, the second audio segment is later than the first audio segment or has an overlapping portion with the first audio segment.

In one example of some embodiments, the target audio data may be divided into the first audio segment and the second audio segment, in which, the first audio segment is an audio segment of a preset duration at the beginning of the target audio data, which may contain the wake-up word. That is, the wake-up word recognition may be performed on the first audio segment to improve the reliability of recognition. The second audio segment indicates a possible speech instruction contained, that is, the speech instruction recognition may be performed on the second audio segment. After acquiring the target audio data, the server recognizes and filters the wake-up word in the first audio segment. When the wake-up word is recognized from the first audio segment, the second audio segment continues to be recognized. After the instruction is recognized from the second audio segment, the client is controlled based on the instruction acquired by recognition. For example, the target audio data acquired by the server is: little A, little A, please play music. Thus, the recognized instruction is to turn on the loudspeaker, and the server sends the instruction "play music" to the client so that the client plays music.

In some embodiments, the server first determines that the wake-up word is recognized from the first audio segment, so that the probability of the invalid target audio data sent by the client due to detection false alarm of the wake-up word, may be reduced, thereby improving the reliability of subsequent recognition.

In some embodiments, the second audio segment is later than the first audio segment, or has an overlapping portion with the first audio segment (that is, there is an overlapping portion between the second audio segment and the first audio segment). In detail, in one scenario of some embodiments, when the speech frame of the wake-up word recognized from the first audio segment is located in an ending frame of the first audio segment, the second audio segment is later than the first audio segment since the instruction is later than the wake-up word. In another scenario of some embodiments, when the speech frame of the wake-up word recognized from the first audio segment is not located in the ending frame of the first audio segment, the instruction may be present in the first audio segment such that there may be the overlapping portion between the second audio segment and the first audio segment to improve the accuracy of instruction recognition.

It should be noted that the ending frame may be a preset frame at the ending of the first audio segment, such as preset 3 frames or 2 frames at the ending, which may be not limited in some embodiments.

With the speech control method provide in some embodiments of the disclosure, the target audio data sent by the client is acquired, in which the target audio data includes the audio data collected by the client within the target duration before wake-up and the audio data collected by the client after wake-up, which increases a probability that the wake-up word is included in the target audio data and improves the reliability and accuracy of the acquired target audio data. Furthermore, the client is controlled based on the instruction recognized from the second audio segment of the target audio data in response to recognizing the wake-up word from the first audio segment at beginning of the target audio data; in which, the second audio segment is later than the first audio segment or has the overlapping portion with the first audio segment. The first audio segment and the second audio segment are divided by the audio frame of the recognized wake-up word, and consecutive recognition is performed, which improves the efficiency and reliability of instruction recognition.

Figure 2:
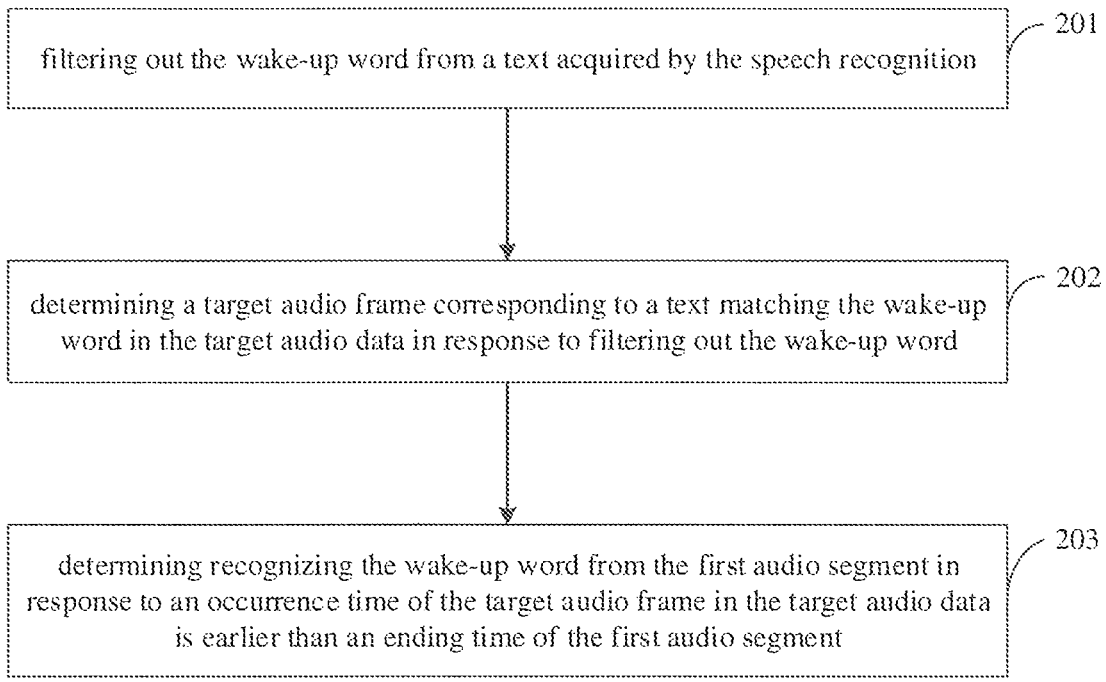
FIG. 2 is a flowchart illustrating a speech control method according to some embodiments of the disclosure.

Based on the previous embodiments, some embodiments further provide a possible implementation of another speech control method, which specifies determining an audio frame corresponding to the wake-up word in the first audio segment by filtering the wake-up word, and determining whether the wake-up word is located in the first audio segment based on the time of the target audio frame corresponding to the wake-up word to improve the reliability of recognizing the wake-up word. FIG. 2 is a flowchart illustrating a speech control method according to some embodiments of the disclosure. As illustrated in FIG. 2, after block 102, the following are further included in the method.

At block 201, the wake-up word is filtered out from a text acquired by the speech recognition.

In a possible implementation of some embodiments of the disclosure, the speech of the target audio data is input to a text recognition network to output the text corresponding to the speech based on the trained text recognition network, and the text indicates a corresponding relationship between different text content and each audio frame in the speech.

Based on the preset wake-up word of the client, the wake-up word is matched in the text corresponding to the speech. As a possible implementation, it is determined whether the wake-up word is matched in the text based on a Euclidean distance and a cosine distance. For example, a preset wake-up word is little A, or ding-dong, the wake-up word matched is "little A, little A".

At block 202, a target audio frame corresponding to a text matching the wake-up word in the target audio data is determined in response to filtering out the wake-up word.

In some embodiments, when the wake-up word is filtered out from the recognized text corresponding to the speech, the target audio frame corresponding to the text matching the wake-up word is determined in the target audio data, and an occurrence time corresponding to the target audio frame is determined.

In one scenario, a certain tail tone exists in the wake-up word in the acquired speech, and a dragging tone of the tail tone exists in the text acquired by the speech recognition, for example, the target audio data is "xiaodu • • • u, open the video", in which, the wake-up word is "xiaodu • • • u", and the instruction is "open the video". In some embodiments, the wake-up word "xiaodu • • • u" is filtered out from the recognition text, and the occurrence time corresponding to the target audio frame is determined after the target audio frame corresponding to the text matching the wake-up word is determined.

That is, in some embodiments, after the wake-up word is filtered out and the occurrence time of the target audio frame is determined, the speech is segmented and the segmentation result is "xiaodu • • • u|open the video", in which, "|" indicates the segmentation time, that is, the time before "|" is the time of the target audio frame, and the time after "|" is an adjacent time after the target audio frame.

At block 203, recognizing the wake-up word from the first audio segment is determined in response to an occurrence time of the target audio frame in the target audio data is earlier than an ending time of the first audio segment.

In some embodiments, when it is determined that the occurrence time of the target audio frame is earlier than the ending time of the first audio segment in the target audio data, it indicates that the wake-up word is included in the first audio segment, which improves the reliability of the wake-up word in the first audio segment, otherwise, it indicates that the wake-up word is not recognized from the first audio segment. Since the instruction is typically spoken after the wake-up word, for example, little A, little A, please open the video, in which "little A, little A" is the wake-up word, and "please open the video" is the instruction. Therefore, after the wake-up word is recognized from the first audio segment, the second audio segment may continue to be recognized to acquire the instruction, to improve the reliability of instruction recognition, and avoid direct abandoning when the wake-up word is not recognized, which leads to failing to recognize the instruction.

With the speech control method provided in some embodiments, the wake-up word is filtered out through the text acquired by the speech recognition, and the target audio frame corresponding to the text matching the wake-up word in the target audio data is determined, which improves the accuracy of the target audio frame corresponding to the wake-up word. When the occurrence time of the target audio frame is earlier than the ending time of the first audio segment, it is determined that the wake-up word is in the first audio segment, and the accuracy and reliability of recognizing the wake-up word from the first audio segment is improved.

Figure 3:
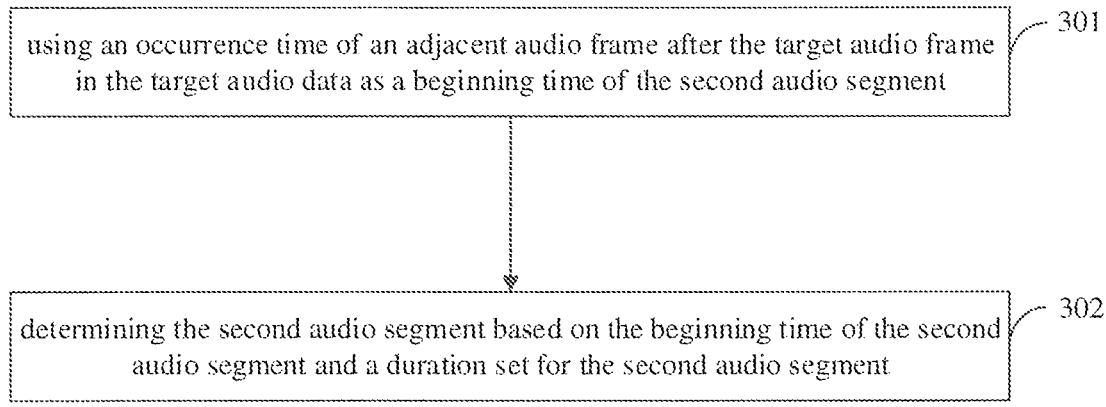
FIG. 3 is a flowchart illustrating a speech control method according to some embodiments of the disclosure.

Based on the above embodiments, some embodiments provide a possible implementation of a speech control method. In response to recognizing the wake-up word from the first audio segment at beginning of the target audio data, the second audio segment is determined based on the target audio frame corresponding to the text matching the wake-up word, so as to improve the accuracy of determining the beginning time of the second audio segment, thereby improving the accuracy and reliability of instruction recognition. Therefore, FIG. 3 is a flowchart illustrating a speech control method according to some embodiments of the disclosure. As illustrated in FIG. 3, after block 203, the following are further included in the method.

At block 301, an occurrence time of an adjacent audio frame after the target audio frame in the target audio data is used as a beginning time of the second audio segment.

At block 302, the second audio segment is determined based on the beginning time of the second audio segment and a duration set for the second audio segment.

In some embodiments, in response to recognizing the wake-up word from the first audio segment, the occurrence time of the adjacent audio frame after the target audio frame corresponding to the text matching the wake-up word is taken as the beginning time of the second audio segment based on the target audio frame corresponding to the text matching the wake-up word, and the second audio segment is determined based on the beginning time of the second audio segment, and the duration set for the second audio segment, to improve the accuracy of determining the beginning time of the second audio segment, and further improving the accuracy of instruction recognition.

For example, the target audio data is "xiaodu • • • u, open the video", in which, the wake-up word is "xiaodu • • • u", and the instruction is "open the video". In some embodiments, after the wake-up word is filtered out and the occurrence time of the target audio frame is determined, the speech is segmented and the segmentation result is "xiaodu • • • u|open the video", in which, "|" indicates the segmentation time, that is, the time before "|" is the time of the target audio frame, and the time after "|" is an adjacent time after the target audio frame. Therefore, the second audio segment in the disclosure is "open the video", and the instruction recognized is "open the video", so as to determine the beginning time of the second audio segment in some embodiments and improve the accuracy of determining the second audio segment. Compared with the related art where the audio data is segmented based on the wake-up time when the wake-up word is detected, and based on the wake-up time, the result acquired by segmentation may be "xiaodu|u (not)~open the video", that is, the second audio segment is "u~open the video", and the instruction acquired based on the second audio segment recognized is "Do Not Open Video", resulting in instruction false recognition.

It should be understood that the time of the target audio frame corresponding to the text matching the wake-up word may be earlier than the ending time the first audio segment or the same as the ending time of the first audio segment, that is, the target audio frame corresponding to the wake-up word may be in a middle frame of the first audio segment and may also be an ending frame. In one scenario, when the target audio frame corresponding to the wake-up word is a middle frame of the first audio segment, there is an overlapping portion between the first audio segment and the second audio segment determined by taking the occurrence time of the adjacent audio frame after the target audio frame as the beginning time of the second audio segment. In another scenario, when the target audio frame corresponding to the wake-up word is an ending frame of the first audio segment, the second audio segment determined by taking the occurrence time of the adjacent audio frame after the target audio frame as the beginning time of the second audio segment is later than the first audio segment. Instruction recognition is performed in the second audio segment determined after the wake-up word is filtered out from the target audio data, which may improve the reliability of instruction recognition.

With the speech control method provided in some embodiments, in response to recognizing the wake-up word from the first audio segment at the beginning of the target audio data, the occurrence time of the adjacent audio frame after the target audio frame corresponding to the text matching the wake-up word is taken as the beginning time of the second audio segment, and the second audio segment is determined based on the beginning time of the second audio segment and the duration set for the second audio segment. That is, the second audio segment is determined based on the target audio frame corresponding to the wake-up word recognized to improve the accuracy of determining the beginning time of the second audio segment, further to improve accuracy of instruction recognition.

Figure 4:
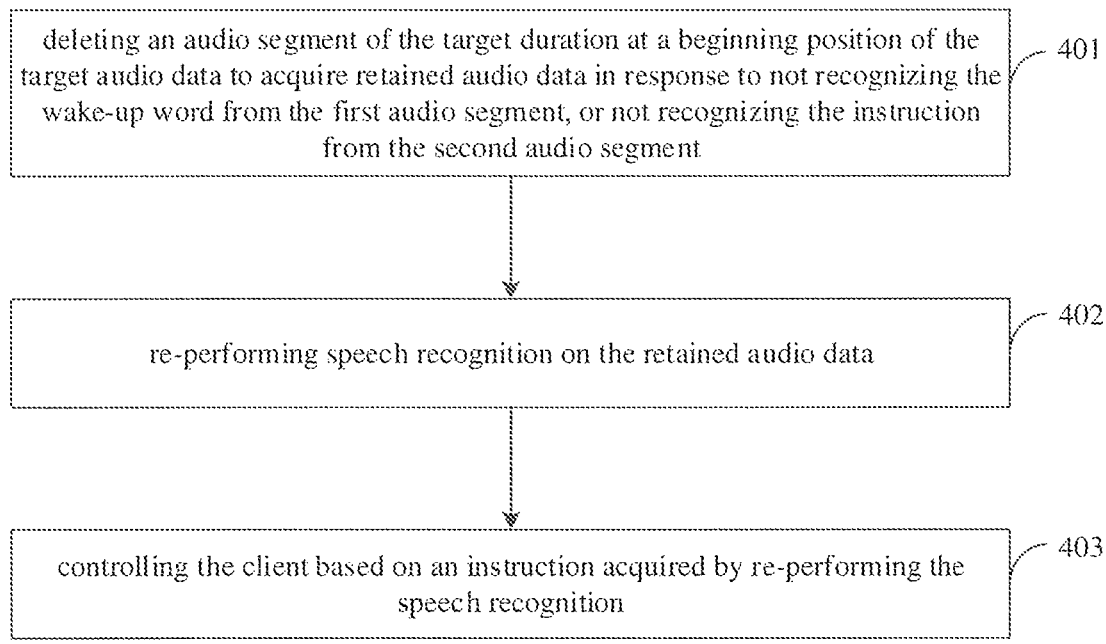
FIG. 4 is a flowchart illustrating a speech control method according to some embodiments of the disclosure.

In practical applications, after the server performs speech recognition on the target audio data, the wake-up word may not be recognized from the first audio segment acquired by dividing the target audio data, or the instruction may not be recognized from the second audio segment. However, the wake-up word may not be recognized from the first audio segment or the instruction may not be recognized from the second audio segment due to inaccurate division of the first audio segment and the second audio segment in the target audio data. Therefore, in order to improve the recognition reliability, in the speech control method in some embodiments, when the wake-up word or the instruction may not be recognized, a preset duration of the audio data is deleted on the target audio data and secondary recognition is performed to improve the recognition reliability. Based on the above embodiments, a possible implementation for the speech control method is provided. FIG. 4 is a flowchart illustrating a speech control method according to some embodiments of the disclosure. As illustrated in FIG. 4, after block 203, the following are further included in the method.

At block 401, an audio segment of the target duration at a beginning position of the target audio data is deleted to acquire retained audio data in response to not recognizing the wake-up word from the first audio segment, or not recognizing the instruction from the second audio segment.

In one scenario of some embodiments, the target audio data includes the audio data collected by the client within the target duration before wake-up and the audio data collected by the client after wake-up. In response to not recognizing the wake-up word from the first audio segment, the first audio segment is determined based on a preset duration at the beginning time of the target audio data, in which, the duration of the first audio segment is greater than the target duration, and the target duration is the preset duration before the wake-up word when the wake-up word is detected, for example, 2 seconds, the first audio segment may be 2.5 seconds. That is, the first audio segment includes the target duration, so as to improve the probability that the first audio segment includes the wake-up word. When the wake-up word is not recognized from the first audio segment, it is deemed that the divided first audio segment is not accurately, and it is understood that the wake-up word is not included in the target duration, so that the audio segment of the target duration at the beginning position of the target audio data is deleted to acquire the retained audio data, that is, division of the first audio segment and the second audio segment is re-performed based on the retained audio data.

In another scenario of some embodiments, in response to not recognizing the instruction from the second audio segment, the division of the first audio segment and the second audio segment may be not reasonable, that is, the second audio segment also includes interference information, such as a partial dragging tone of the wake-up word, for example, "xiaodu|u (not)~open the video", the audio segment of the target duration at the beginning position of the target audio data is deleted to acquire the retained audio data, that is, speech recognition needs to be re-performed based on the retained audio data.

At block 402, speech recognition is re-performed on the retained audio data.

At block 403, the client is controlled based on an instruction acquired by re-performing the speech recognition.

In one example of some embodiments, the speech recognition is re-performed on the retained audio data, and a first audio segment and a second audio segment may be re-determined in the retained audio data, and the second audio segment is re-divided based on the retained audio data, and an instruction is recognized based on the re-divided second audio segment, in which, the duration of the second audio segment is greater than that of the first audio segment, and a longer second audio segment is set to improve the reliability of instruction recognition.

With the speech control method provided in some embodiments in the disclosure, the target audio data is recognized and the first audio segment and the second audio segment are consecutively recognized. When the wake-up word is not recognized from the first audio segment or the instruction word is not recognized from the second audio segment, the audio segment of the target duration at the beginning position of the target audio data is deleted to acquire the retained audio data, and then decoding recognition is re-performed on the retained audio data. Compared with the related art where the speech recognition is performed once only on the acquired audio segment, the method may improve the recognition reliability.

Figure 5:
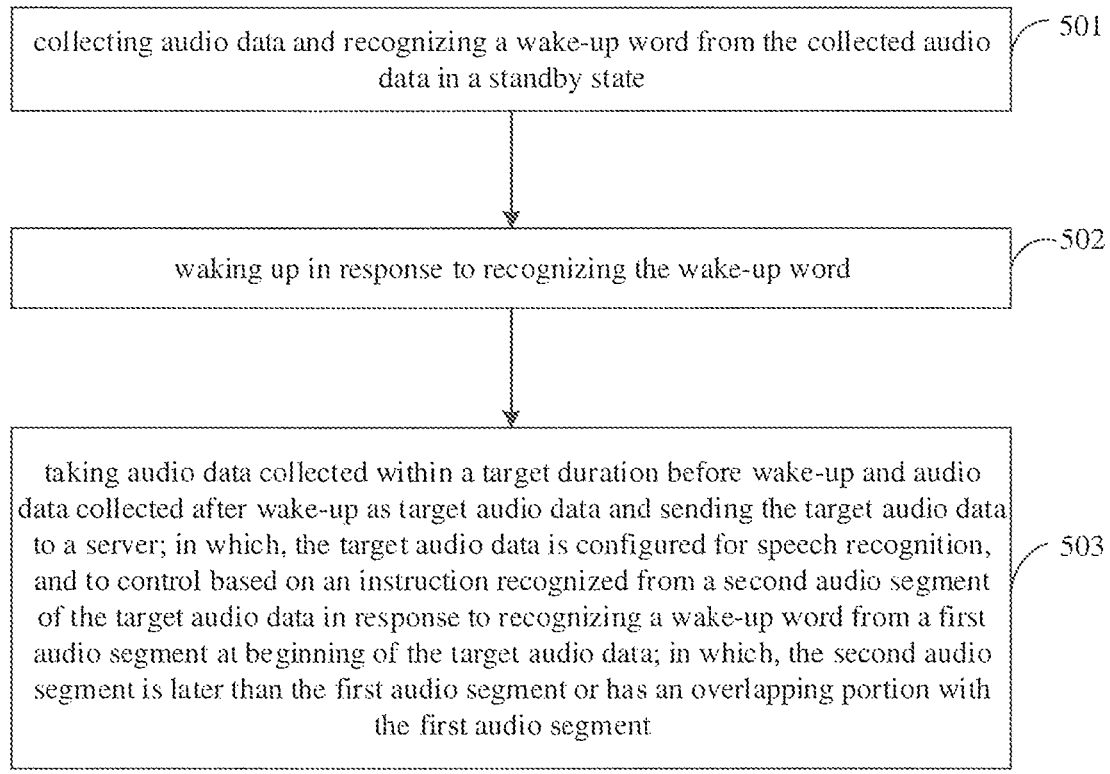
FIG. 5 is a flowchart illustrating a speech control method according to some embodiments of the disclosure.

In order to implement the above embodiments, some embodiments provide another speech control method. The executive body of the method is a client. FIG. 5 is a flowchart illustrating a speech control method according to some embodiments of the disclosure.

As illustrated in FIG. 5, the method may include the following.

At block 501, audio data is collected and a wake-up word is recognized from the collected audio data in a standby state.

The executive body in some embodiments is the client.

In some embodiments, the client collects the audio data by a microphone set on the client in a stand-by state and recognizes the wake-up word after denoise processing on the collected audio data, to improve the reliability of recognizing the wake-up word. As a possible implementation, a wake-up word recognition model based on Natural Language Processing (NLP) technology acquired by pre-training is adopted to recognize the wake-up word on the acquired audio data.

At block 502, it wakes up in response to recognizing the wake-up word.

In detail, in a case that the client recognizes that the collected audio data includes the wake-up word, the client is waked up, that is, the client is transformed from a low sleep state to a wake-up state that may receive an instruction.

At block 503, audio data collected within a target duration before wake-up and audio data collected after wake-up are taken as target audio data and the target audio data is sent to a server; in which, the target audio data is configured for speech recognition, and to control based on an instruction recognized from a second audio segment of the target audio data in response to recognizing a wake-up word from a first audio segment at beginning of the target audio data; in which, the second audio segment is later than the first audio segment or has an overlapping portion with the first audio segment.

In some embodiments of the disclosure, in a case that the client recognizes that the audio data collected contains the wake-up word, the target audio data is collected. In order to improve the accuracy of the target audio data, the target audio data includes the audio data collected by the client within the target duration before wake-up and the audio data collected by the client after wake-up. That is, the client performs speech detection, and acquires the audio data of the target duration forward based on the detection time of the wake-up word after the wake-up word is detected (that is, the audio data within the target duration before wake-up), and collects the audio data of a preset duration after wake-up, for example, the time point of detecting the wake-up word is t, the time point of t-5 is taken as the beginning point of the speech, so as to acquire the target audio data of the duration T. The target audio data in the disclosure includes the audio data within the target duration before wake-up and the audio data collected after wake-up, so that the target audio data acquired may cover a speech portion of the wake-up word, which avoids poor precision of the target audio data due to inaccurate detection time caused by determining the beginning point of collecting the audio data based on the wake-up time in the related art and enhances the reliability of collecting the target audio data.

In some embodiments, the second audio segment is later than the first audio segment or there is an overlapping portion between the second audio segment and the first audio segment. In one scenario, when the target audio frame corresponding to the wake-up word is a middle frame of the first audio segment, there is an overlapping portion between the first audio segment and the second audio segment determined by taking the occurrence time of the adjacent audio frame after the target audio frame as the beginning time of the second audio segment. In another scenario, when the target audio frame corresponding to the wake-up word is an ending frame of the first audio segment, the second audio segment determined by taking the occurrence time of the adjacent audio frame after the target audio frame as the beginning time of the second audio segment is later than the first audio segment. When instruction recognition is performed in the second audio segment determined after the wake-up word is filtered out from the target audio data, which may improve the reliability of instruction recognition.

Further, after the client acquires the target audio data, the target audio data is sent to the server so that the server recognizes the target audio data based on the acquired target audio data and consecutively recognizes the first audio segment and the second audio segment. When the wake-up word is not recognized from the first audio segment or the instruction word is not recognized from the second audio segment, the audio segment of the target duration at the beginning position of the target audio data is deleted to acquire the retained audio data, and then decoding recognition is re-performed on the retained audio data. Compared with the related art where the speech recognition is performed once only on the acquired audio segment, the method may improve the recognition reliability.

It should be noted that, the description about how the server recognizes the acquired target audio data in the embodiment of the foregoing server also applies to the embodiment, which is not repeated here.

With the speech control method provided in some embodiments, the audio data is collected and the wake-up word is recognized from the collected audio data in the standby state. It wakes up the client in response to recognizing the wake-up word. The audio data collected within the target duration before wake-up and the audio data collected after wake-up are taken as the target audio data and the target audio data is sent to the server, in which the target audio data is configured for speech recognition, and to control based on an instruction recognized from a second audio segment of the target audio data in response to recognizing a wake-up word from a first audio segment at beginning of the target audio data; in which, the second audio segment is later than the first audio segment or has an overlapping portion with the first audio segment. In some embodiments, the target audio data collected includes the audio data within the target duration before wake-up and the audio data collected after wake-up, to implement advancing the beginning point of the acquired speech, so that the acquired speech includes the wake up word and the speech acquired reflects a real intention of the user and improves the recognition reliability. The inaccurate beginning point of the acquired speech caused by taking the wake-up time as the beginning point of the acquired speech so that the acquired target audio data is not the audio data reflecting the real intention of the user is avoided, which leads to low recognition accuracy.

Based on the above embodiments, the target audio data is in an audio stream format, and consecutive collection of the speech is achieved through the audio stream format.

To achieve the above embodiments, the disclosure further provides a speech control apparatus. The apparatus is configured in a server.

Figure 6:
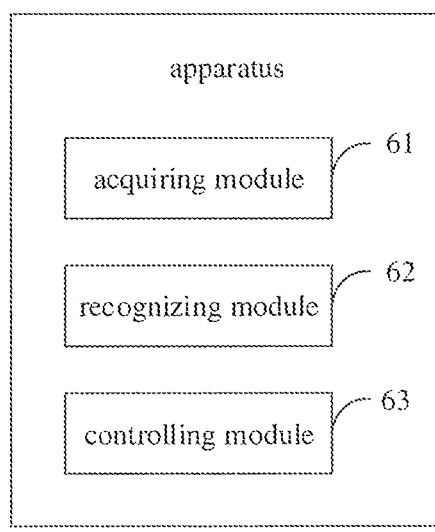
FIG. 6 is a block diagram illustrating a speech control apparatus according to some embodiments of the disclosure.

FIG. 6 is a block diagram illustrating a speech control apparatus according to some embodiments of the disclosure.

As illustrated in FIG. 6, the apparatus includes an acquiring module 61, a recognizing module 62, and a controlling module 63.

The acquiring module 61 is configured to acquire target audio data sent by a client, the target audio data including audio data collected by the client within a target duration before wake-up and audio data collected by the client after wake-up.

The recognizing module 62 is configured to perform speech recognition on the target audio data.

The controlling module 63 is configured to control the client based on an instruction recognized from a second audio segment of the target audio data in response to recognizing a wake-up word from a first audio segment at beginning of the target audio data; in which, the second audio segment is later than the first audio segment or has an overlapping portion with the first audio segment.

Further, in a possible implementation in some embodiments of the disclosure, the apparatus further includes: a deleting module.

The deleting module is configured to delete an audio segment of the target duration at a beginning position of the target audio data to acquire retained audio data in response to not recognizing the wake-up word from the first audio segment, or not recognizing the instruction from the second audio segment.

The recognizing module 62 is further configured to re-perform speech recognition on the retained audio data.

The controlling module 63 is further configured to control the client based on an instruction acquired by re-performing the speech recognition.

In a possible implementation in some embodiments of the disclosure, a duration of the first audio segment is greater than the target duration; and a duration of the second audio segment is greater than the duration of the first audio segment.

In a possible implementation in some embodiments of the disclosure, the apparatus further includes: a filtering module and a determining module.

The filtering module is configured to filter out the wake-up word from a text acquired by the speech recognition.

The determining module is configured to determine a target audio frame corresponding to a text matching the wake-up word in the target audio data in response to filtering out the wake-up word and determine recognizing the wake-up word from the first audio segment in response to an occurrence time of the target audio frame in the target audio data is earlier than an ending time of the first audio segment.

In a possible implementation in some embodiments of the disclosure, the controlling module 63 is further configured to: use an occurrence time of an adjacent audio frame after the target audio frame in the target audio data as a beginning time of the second audio segment; and determine the second audio segment based on the beginning time of the second audio segment and a duration set for the second audio segment.

It should be noted that the foregoing explanation of the method embodiments implemented by the server also may be applicable to the apparatus in some embodiments, which will not be repeated herein.

With the speech control apparatus provided in some embodiments of the disclosure, the target audio data is recognized and the first audio segment and the second audio segment are consecutively recognized. When the wake-up word is not recognized from the first audio segment or the instruction word is not recognized from the second audio segment, the audio segment of the target duration at the beginning position of the target audio data is deleted to acquire the retained audio data, and then decoding recognition is re-performed on the retained audio data. Compared with the related art where the speech recognition is performed once only on the acquired audio segment, the apparatus may improve the recognition reliability.

To achieve the above embodiments, the disclosure further provides another speech control apparatus. The apparatus is configured in a client.

Figure 7:
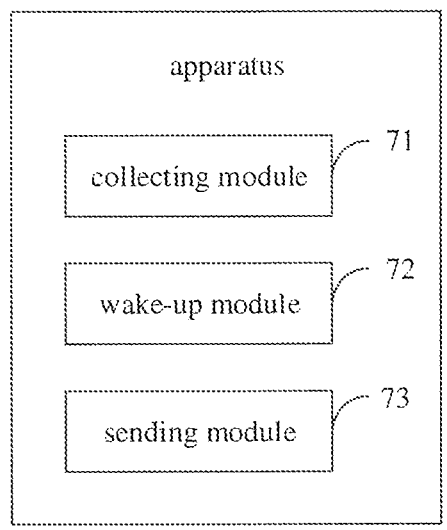
FIG. 7 is a block diagram illustrating a speech control apparatus according to some embodiments of the disclosure.

FIG. 7 is a block diagram illustrating a speech control apparatus according to some embodiments of the disclosure.

As illustrated in FIG. 7, the apparatus includes a collecting module 71, a wake-up module 72, and a sending module 73.

The collecting module 71 is configured to collect audio data and recognize a wake-up word from the collected audio data in a standby state.

The wake-up module 72 is configured to wake up in response to recognizing the wake-up word.

The sending module 73 is configured to take audio data collected within a target duration before wake-up and audio data collected after wake-up as target audio data and send the target audio data to a server; in which, the target audio data is configured for speech recognition, and to control based on an instruction recognized from a second audio segment of the target audio data in response to recognizing a wake-up word from a first audio segment at beginning of the target audio data; in which, the second audio segment is later than the first audio segment or has an overlapping portion with the first audio segment.

Further, in a possible implementation in some embodiments of the disclosure, the target audio data is in an audio stream format.

It should be noted that the foregoing explanation of the method embodiments implemented by the client may also be applicable to the speech control apparatus in some embodiments, which will not be repeated herein.

With the speech control apparatus provided in some embodiments, the audio data is collected and the wake-up word is recognized from the collected audio data in the standby state. It wakes up the client in response to recognizing the wake-up word. The audio data collected within the target duration before wake-up and the audio data collected after wake-up are taken as the target audio data and the target audio data is sent to the server, in which the target audio data is configured for speech recognition, and to control based on an instruction recognized from a second audio segment of the target audio data in response to recognizing a wake-up word from a first audio segment at beginning of the target audio data; in which, the second audio segment is later than the first audio segment or has an overlapping portion with the first audio segment. In some embodiments, the target audio data collected includes the audio data within the target duration before wake-up and the audio data collected after wake-up, to implement advancing the beginning point of the acquired speech, so that the acquired speech includes the wake up word and the speech acquired reflects a real intention of the user and improves the recognition reliability. The inaccurate beginning point of the acquired speech caused by taking the wake-up time as the beginning point of the acquired speech so that the acquired target audio data is not the audio data reflecting the real intention of the user is avoided, which leads to low recognition accuracy.

An electronic device and a readable storage medium are further provided according to some embodiments of the disclosure.

Figure 8:
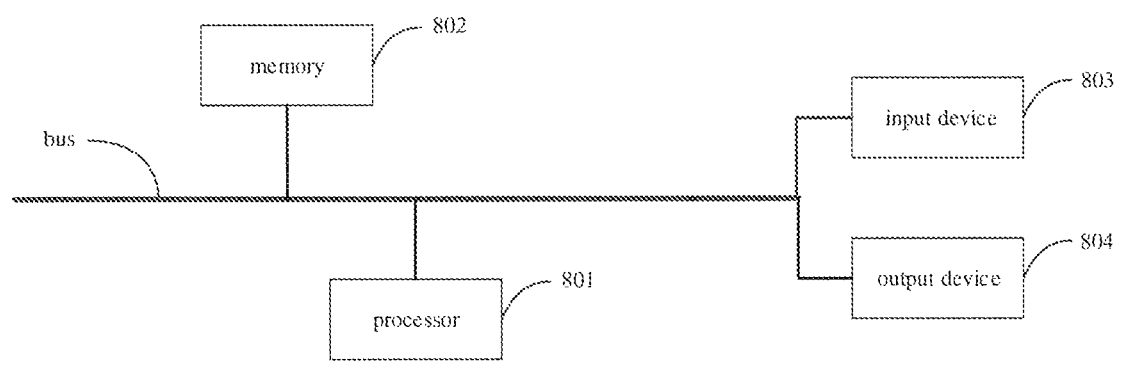
FIG. 8 is a block diagram illustrating an electronic device for implementing a speech control method according to some embodiments of the disclosure.

FIG. 8 is a block diagram illustrating an electronic device for implementing a speech control method according to some embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 8, the electronic device includes: one or more processors 801, a memory 802, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 801 is taken as an example.

The memory 802 is a non-transitory computer readable storage medium provided by the disclosure. The memory is configured to store instructions executable by at least one processor, to enable the at least one processor to execute the method provided by the disclosure. The non-transitory computer readable storage medium provided by the disclosure is configured to store computer instructions. The computer instructions are configured to enable a computer to execute the method provided by the disclosure.

As the non-transitory computer readable storage medium, the memory 802 may be configured to store non-transitory software programs, non-transitory computer executable programs and modules, such as program instructions/module corresponding to the method according to embodiments of the disclosure (such an acquiring module 61, a recognizing module 62, and a controlling module 63 in FIG. 6). The processor 801 is configured to execute various functional applications and data processing of the server by operating non-transitory software programs, instructions and modules stored in the memory 802, that is, implements the method according to the above method embodiments.

The memory 802 may include a storage program region and a storage data region. The storage program region may store an application required by an operating system and at least one function. The storage data region may store data created according to predicted usage of the electronic device based on the semantic representation. In addition, the memory 802 may include a high-speed random access memory, and may also include a non-transitory memory, such as at least one disk memory device, a flash memory device, or other non-transitory solid-state memory device. In some embodiments, the memory 802 may optionally include memories remotely located to the processor 801, and these remote memories may be connected to the electronic device via a network. Examples of the above network include, but are not limited to, an Internet, an intranet, a local area network, a mobile communication network and combinations thereof.

The electronic device capable of implementing the method may also include: an input device 803 and an output device 804. The processor 801, the memory 802, the input device 803, and the output device 804 may be connected via a bus or in other means. In FIG. 7, the bus is taken as an example.

The input device 803 may receive inputted digital or character information, and generate key signal input related to user setting and function control of the electronic device capable of implementing the method, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solutions according to embodiments of the disclosure, the target audio data is recognized and the first audio segment and the second audio segment are consecutively recognized. When the wake-up word is not recognized from the first audio segment or the instruction word is not recognized from the second audio segment, the audio segment of the target duration at the beginning position of the target audio data is deleted to acquire the retained audio data, and then decoding recognition is re-performed on the retained audio data. Compared with the related art where the speech recognition is performed once only on the acquired audio segment, the apparatus may improve the recognition reliability.

It should be understood that, steps may be reordered, added or deleted by utilizing flows in the various forms illustrated above. For example, the steps described in the disclosure may be executed in parallel, sequentially or in different sequences, so long as desired results of the technical solutions disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A speech control method, comprising:
acquiring target audio data sent by a client, the target audio data comprising audio data collected by the client within a target duration before wake-up and audio data collected by the client after wake-up;
performing speech recognition on the target audio data; and
controlling the client based on an instruction recognized from a second audio segment of the target audio data in response to recognizing a wake-up word from a first audio segment at beginning of the target audio data; in which, the second audio segment is later than the first audio segment or has an overlapping portion with the first audio segment, wherein a duration of the first audio segment is greater than the target duration;
wherein the method further comprises:
deleting an audio segment of the target duration at a beginning position of the target audio data to acquire retained audio data in response to not recognizing the wake-up word from the first audio segment, or not recognizing the instruction from the second audio segment;
re-performing speech recognition on the retained audio data to obtain a re-devised first audio segment and a re-devised second audio segment; and
controlling the client based on an instruction recognized from the re-divided second audio segment.

2. The method of claim 1, wherein
a duration of the second audio segment is greater than the duration of the first audio segment.

3. The method of claim 1, further comprising:
filtering out the wake-up word from a text acquired by the speech recognition;
determining a target audio frame corresponding to a text matching the wake-up word in the target audio data in response to filtering out the wake-up word; and
determining recognizing the wake-up word from the first audio segment in response to an occurrence time of the target audio frame in the target audio data is earlier than an ending time of the first audio segment.

4. The method of claim 3, further comprising:
using an occurrence time of an adjacent audio frame after the target audio frame in the target audio data as a beginning time of the second audio segment; and
determining the second audio segment based on the beginning time of the second audio segment and a duration set for the second audio segment.

5. The method of claim 1, wherein, the target audio data is in an audio stream format.

6. A speech control method, comprising:
collecting audio data and recognizing a wake-up word from the collected audio data in a standby state;
waking up in response to recognizing the wake-up word;
taking audio data collected within a target duration before wake-up and audio data collected after wake-up as target audio data and sending the target audio data to a server;
in which, the target audio data is configured for speech recognition, and to control based on an instruction recognized from a second audio segment of the target audio data in response to recognizing a wake-up word from a first audio segment at beginning of the target audio data; in which, the second audio segment is later than the first audio segment or has an overlapping portion with the first audio segment, wherein a duration of the first audio segment is greater than the target duration;
wherein the method further comprises:
deleting an audio segment of the target duration at a beginning position of the target audio data to acquire retained audio data in response to not recognizing the wake-up word from the first audio segment, or not recognizing the instruction from the second audio segment;

re-performing speech recognition on the retained audio data to obtain a re-devised first audio segment and a re-devised second audio segment; and controlling the client based on an instruction recognized from the re-divided second audio segment.

7. The method of claim 6, wherein, the target audio data is in an audio stream format.

8. An electronic device, comprising:

at least one processor; and a memory communicatively coupled to the at least one processor; wherein, the memory is configured to store instructions executable by the at least one processor, and when the instructions are executed by the at least one processor, the at least one processor is caused to perform:

acquiring target audio data sent by a client, the target audio data comprising audio data collected by the client within a target duration before wake-up and audio data collected by the client after wake-up;

performing speech recognition on the target audio data; and controlling the client based on an instruction recognized from a second audio segment of the target audio data in response to recognizing a wake-up word from a first audio segment at beginning of the target audio data; in which, the second audio segment is later than the first audio segment or has an overlapping portion with the first audio segment, wherein a duration of the first audio segment is greater than the target duration;

wherein when the instructions are executed by the at least one processor, the at least one processor is caused to perform:

deleting an audio segment of the target duration at a beginning position of the target audio data to acquire retained audio data in response to not recognizing the wake-up word from the first audio segment, or not recognizing the instruction from the second audio segment;

re-performing speech recognition on the retained audio data to obtain a re-devised first audio segment and a re-devised second audio segment; and controlling the client based on an instruction recognized from the re-divided second audio segment.

9. The device of claim 8, wherein a duration of the second audio segment is greater than the duration of the first audio segment.

10. The device of claim 8, wherein when the instructions are executed by the at least one processor, the at least one processor is caused to perform:

filtering out the wake-up word from a text acquired by the speech recognition;

determining a target audio frame corresponding to a text matching the wake-up word in the target audio data in response to filtering out the wake-up word; and determining recognizing the wake-up word from the first audio segment in response to an occurrence time of the target audio frame in the target audio data is earlier than an ending time of the first audio segment.

11. The device of claim 10, wherein when the instructions are executed by the at least one processor, the at least one processor is caused to perform:

using an occurrence time of an adjacent audio frame after the target audio frame in the target audio data as a beginning time of the second audio segment; and determining the second audio segment based on the beginning time of the second audio segment and a duration set for the second audio segment.

12. The device of claim 8, wherein, the target audio data is in an audio stream format.

* * * * *